A. EHRET.
Gas-Burner for Heating Purposes.
No. 161,939. Patented April 13, 1875.
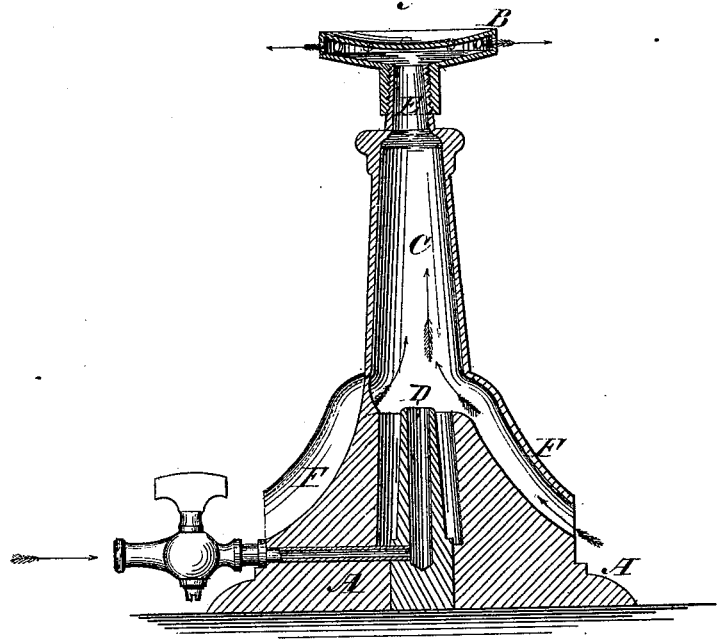
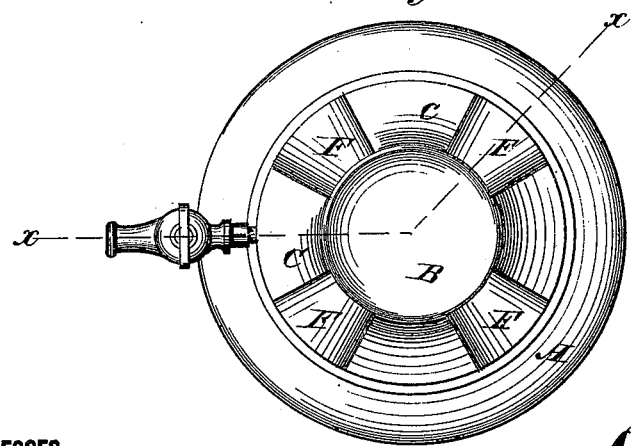

UNITED STATES PATENT OFFICE.

ANATOLE EHRET, OF SAN FRANCISCO, CALIFORNIA.

IMPROVEMENT IN GAS-BURNERS FOR HEATING PURPOSES.

Specification forming part of Letters Patent No. 161,939, dated April 13, 1875; application filed January 25, 1875.

*To all whom it may concern:*

Be it known that I, ANATOLE EHRET, of San Francisco, in the county of San Francisco and State of California, have invented a new and Improved Gas-Burner, of which the following is a specification:

My invention relates to a gas-burner for heating purposes; and it consists of a chamber in the standard on which the burner is mounted, into which the gas-pipe leading to the burner discharges, and into which there are four (more or less) air-pipes entering from the base of the stand, or thereabout, so as to draw in an abundant supply of air to mix with the gas in the chamber, and so obtain a larger supply of oxygen than can be had by discharging the pure gas into the air at the burner.

Figure 1 is a sectional elevation of my improved burner, and Fig. 2 is a plan view.

Similar letters of reference indicate corresponding parts.

A is the stand, having a burner, B, on the top, which may be of any approved kind. C is the chamber within the stand, into which the gas-pipe D discharges at the bottom, and from which the combined air and gas pass to the burner at E; and F represents the air-pipes leading up from the chamber into it, where the gas-pipe discharges, to supply air for mixing with the gas in the chamber to increase the proportion of oxygen for making intense heat for heating purposes.

The oxygen obtained in this way will be in excess of what is obtained at the burner, for this mixture of gas and air will obtain the same measure of oxygen thereat that the gas alone will.

Having thus described my invention, what I claim as new, and desire to secure by Letters Patent, is—

As an article of manufacture, the heater A B C D E F, constructed substantially as and for the purpose specified.

ANATOLE EHRET.

Witnesses:
J. FIOJUIÈR,
F. X. OLANIÉ.